(12) United States Patent
Geiger

(10) Patent No.: US 7,753,321 B2
(45) Date of Patent: Jul. 13, 2010

(54) HARNESS CLAMP TIE

(75) Inventor: Gerard G. Geiger, Jackson, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 12/221,632

(22) Filed: Aug. 5, 2008

(65) Prior Publication Data

US 2008/0296444 A1    Dec. 4, 2008

Related U.S. Application Data

(63) Continuation of application No. 11/191,654, filed on Jul. 28, 2005, now abandoned.

(51) Int. Cl.
    *F16L 3/00* (2006.01)
(52) U.S. Cl. .................. 248/74.3; 248/71; 248/68.1
(58) Field of Classification Search ............ 248/68.1, 248/71, 74.3, 74.2, 74.4, 74.5, 67.5, 65, 67.7
    See application file for complete search history.

(56) References Cited

U.S. PATENT DOCUMENTS

| | | |
|---|---|---|
| 3,252,677 A | 5/1966 | Raymond |
| 3,463,427 A | 8/1969 | Fisher |
| 3,605,199 A | 9/1971 | Eberhardt |
| 4,427,328 A | 1/1984 | Kojima |
| 4,766,651 A | 8/1988 | Kobayashi et al. |
| 4,875,647 A | 10/1989 | Takagi et al. |
| 4,910,831 A | 3/1990 | Bingold |
| 4,919,373 A | 4/1990 | Caveney et al. |
| 4,944,475 A | 7/1990 | Ono et al. |
| 4,993,669 A | 2/1991 | Dyer |
| 5,088,158 A | 2/1992 | Burkholder |
| 5,102,075 A | 4/1992 | Dyer |
| 5,131,613 A | 7/1992 | Kamiya et al. |
| D347,156 S | 5/1994 | Starrett et al. |
| 5,333,822 A | 8/1994 | Benoit et al. |
| 5,368,261 A | 11/1994 | Caveney et al. |
| 5,385,321 A | 1/1995 | Kume et al. |
| 5,398,383 A | 3/1995 | Bingold |
| D372,665 S | 8/1996 | Kim |
| 5,601,261 A | 2/1997 | Koike |
| 5,704,573 A | 1/1998 | de Beers et al. |

(Continued)

FOREIGN PATENT DOCUMENTS

EP    943240    10/1961

*Primary Examiner*—J. Allen Shriver, II
*Assistant Examiner*—Steven M Marsh
(74) *Attorney, Agent, or Firm*—Ryan Kromholz & Manion, S.C.

(57) ABSTRACT

A harness clamp tie includes a locking head and a flexible strap extending outwardly from the locking head. The strap is insertable through the locking head to form a loop that can be used at least one item. A pawl in the locking head secures the strap. Nonslip rails formed along the outer edge of the strap face and clamping rails formed on the locking head aid in securing small items. Conic friction points are formed on both sides of the strap surface to provide a mechanical grip for pulling the strap through the locking head. A mounting fastener extends from the locking head in the opposite direction. The fastener secures the tie to a mounting structure such as an aperture in a panel. The fastener includes a pair of flexible winged springs which help to stabilize the tie and hold the tie perpendicular to the panel.

7 Claims, 7 Drawing Sheets

U.S. PATENT DOCUMENTS

| | | | |
|---|---|---|---|
| 5,732,446 A | 3/1998 | Blanks |
| 5,765,787 A | 6/1998 | de Beers et al. |
| 5,774,944 A | 7/1998 | Choi |
| 5,820,083 A | 10/1998 | Geiger |
| 5,890,265 A | 4/1999 | Christian et al. |
| 5,921,510 A | 7/1999 | Benoit et al. |
| 5,926,921 A | 7/1999 | Benoit |
| 5,966,781 A | 10/1999 | Geiger |
| D417,142 S | 11/1999 | Kim |
| D417,387 S | 12/1999 | Kim |
| D417,838 S | 12/1999 | Kim |
| 6,003,208 A | 12/1999 | Christian et al. |
| 6,105,908 A | 8/2000 | Kraus |
| 6,151,761 A | 11/2000 | Thompson |
| 6,196,033 B1 | 3/2001 | Dowdle |
| 6,240,602 B1 | 6/2001 | Geiger |
| 6,253,421 B1 | 7/2001 | Kraus |
| 6,364,257 B1 | 4/2002 | Holder |
| 6,532,631 B2 | 3/2003 | Rohaly et al. |
| 6,550,723 B2 | 4/2003 | Fraley, II et al. |
| 6,560,822 B2 | 5/2003 | Caveney et al. |
| 6,634,063 B2 * | 10/2003 | Joseph ................ 24/16 R |
| 6,655,644 B1 | 12/2003 | Gretz |
| 6,669,150 B2 | 12/2003 | Benoit et al. |
| 6,718,597 B2 | 4/2004 | Geiger |
| 6,719,513 B1 | 4/2004 | Moutousis et al. |
| 6,745,439 B2 | 6/2004 | Browniee et al. |
| 6,749,157 B2 | 6/2004 | Takeuchi |
| 6,807,714 B2 | 10/2004 | O'Young et al. |
| 7,055,783 B2 | 6/2006 | Rosemann et al. |
| 7,131,168 B2 | 11/2006 | Pangallo |

* cited by examiner

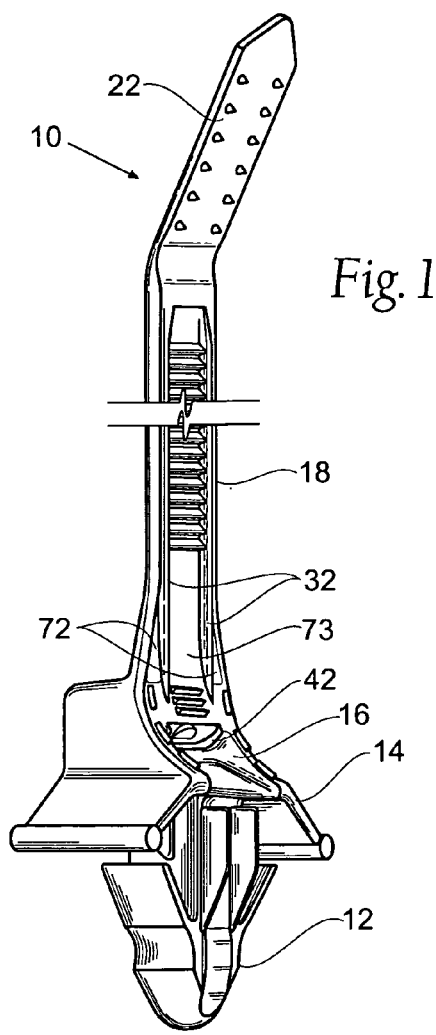
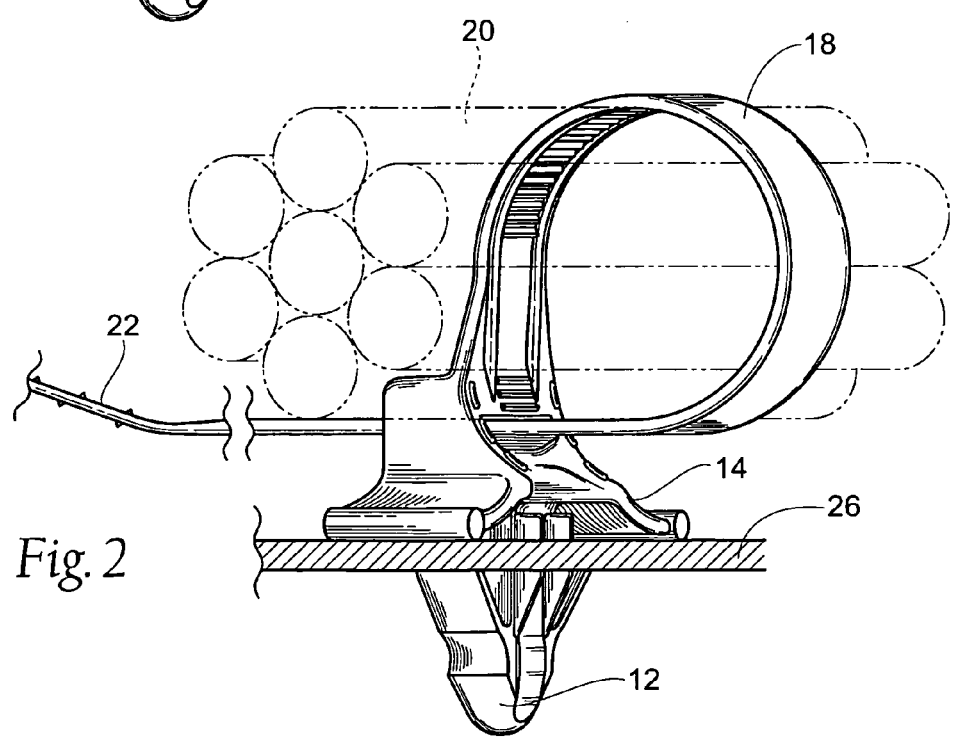

HARNESS CLAMP TIE

RELATED APPLICATIONS

This application is a continuation of co-pending U.S. patent application Ser. No. 11/191,654, filed 28 Jul. 2005 now abandoned.

BACKGROUND OF THE INVENTION

The present invention relates to a one piece flexible tie having a locking head to harness elongate objects such as wires in a bundle and having means for securing the bundled wires to an aperture in a mounting surface.

Various devices have been developed to bundle and secure cables or wires to an aperture in a mounting surface. Among these devices are ties used to secure a multitude of wires, cables, tubing and similar items into tight, neat bundles. These cable ties are frequently used on electrical wires or cables to form harnesses in telecommunications equipment, aircraft, appliances, vehicles, and the like. Examples of such ties are shown in U.S. Pat. Nos. 4,875,647, 4,919,373, 4,944,475, and 5,131,613.

Although these known cable ties possess some desired characteristics, they also include many undesirable characteristics. For example, while effective for bundling larger groups of items, none of the devices shown in these patents provides for securely fastening a small bundle of items, or only one item, to a panel. Additionally, a reduction in the insertion force needed to apply the cable tie to a panel is desired. It is also desirable to reduce the tension required to close the cable tie around a bundle of elongate objects. These improvements would lead to ease in use and installation of the cable tie and a reduction in the incidence of carpal tunnel syndrome in users. Additionally, it is desirable to have a cable tie with increased stability when the cable tie is in use and fastened to a panel.

SUMMARY OF THE INVENTION

The harness clamp tie of the present invention has a locking head, a thin flexible strap extending in one direction from the locking head, and a fastener extending from the locking head in the opposite direction. A portion of the strap is formed with serrations. Clamping rails are formed along each edge of the bottom surface the strap. Rows of conic friction points are integrally formed on a portion of both the top and bottom surfaces of the strap. Additional clamping rails are formed on the bottom side of the locking head. A pawl is disposed within a slot in the locking head for engaging and retaining at least one of the serrations on the strap when the strap is looped around a bundle of items and returned through the slot.

The fastener is integrally formed with the locking head. The fastener may be inserted through an aperture in a panel to secure the cable tie to the panel. The fastener has an arrowhead shape with two blades connected by a leading tip. Each blade is integrally formed to an arm that is also integrally formed to the fastener side of the locking head. The blades and arms are inwardly compressible to allow the fastener to be inserted into the aperture in the panel. Several outwardly extending vanes are formed on the arms of the fastener, the vanes being adapted to adjust to varying diameters of apertures.

An alternate embodiment of the fastener has a rectangular fir tree shape. This embodiment of the fastener has a first section and a second section with a center section extending therebetween. The center section has a first surface and a second surface with a plurality of branches being formed on both surfaces. The branches are compressible to allow the fastener to be inserted into the aperture in the panel.

It is an object of this invention to provide a harness clamp tie for the bundling of wires of various diameters, including smaller diameters, that has reduced installation tension, increased fastener stability, and a fastener requiring a reduced insertion force.

It is also an object of thins invention to provide a harness clamp tie which is easier to tighten around bundles and not prone to breakage while applying.

BRIEF DESCRIPTION OF THE DRAWINGS

FIG. 1 is a perspective view of the preferred embodiment of the harness clamp tie of the present invention.

FIG. 2 is a perspective view of the harness clamp tie of the present invention secured around a bundle of wires (shown in phantom) and inserted into an aperture in a panel, as it is in normal use.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other specific structures. While the preferred embodiment has been described, the details may be changed without departing from the invention, which is defined by the claims.

Figure 3A:
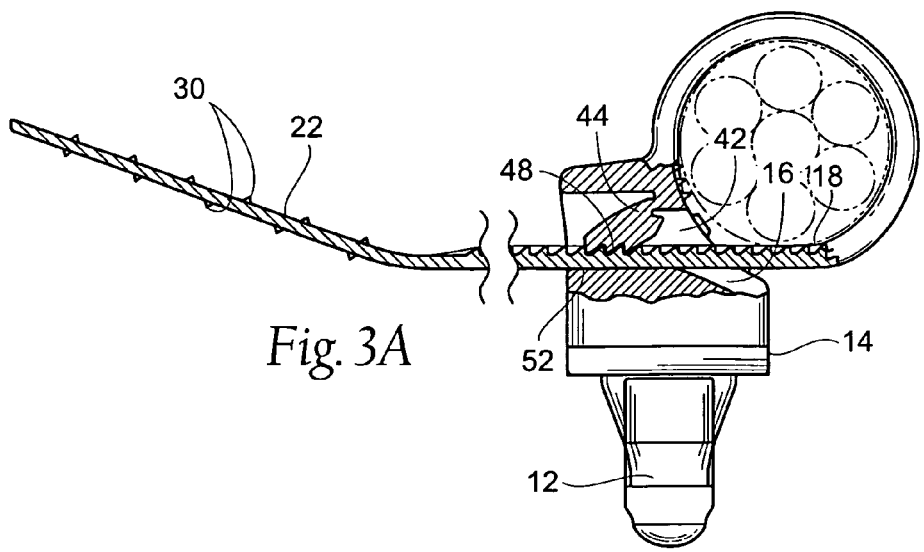
FIG. 3A is a sectional view of the locking head of the harness clamp tie of the present invention, with the strap inserted through the locking head supporting a bundle of elongate items.

FIG. 1 shows the preferred embodiment of the harness clamp tie 10 of the present invention. As seen therein the tie includes a fastener 12, a pair of winged springs 14, a locking head 16, and an elongate flexible strap 18. FIG. 2 shows the preferred embodiment of the present invention in use. The strap 18 is looped around a bundle of items 20, such as wires, and secured by inserting the strap tail portion 22 through a slot 42 in the locking head 16 and pulling the strap 18 tight. As shown in FIGS. 3A and B, a pawl 44 is disposed within the slot 42 to secure the strap 18 within the slot 42. A shown in FIG. 11, the harness clamp tie 10 is secured to a panel 26 by insertion of the fastener 12 into a mounting aperture 24 in a panel 26.

Figure 6:
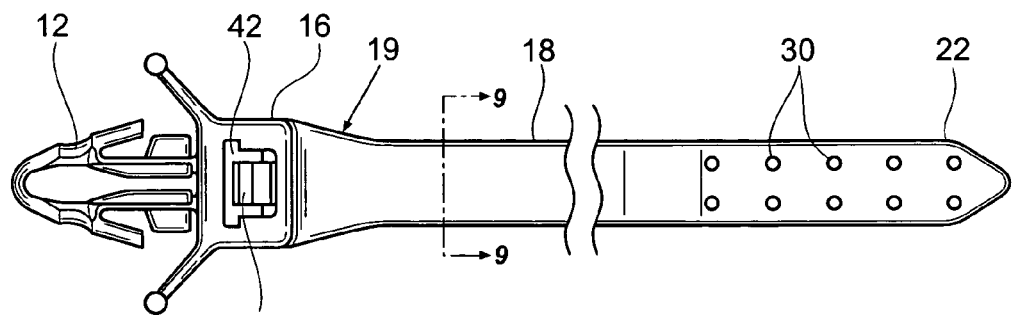
FIG. 6 is a top plan view of the harness clamp tie of FIG. 1.
Figure 7:
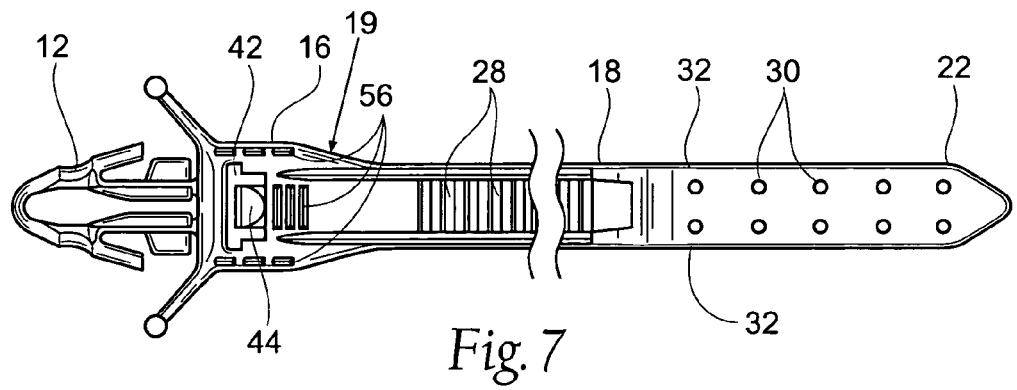
FIG. 7 is a bottom plan view of the harness clamp tie of the present invention.
Figure 9:
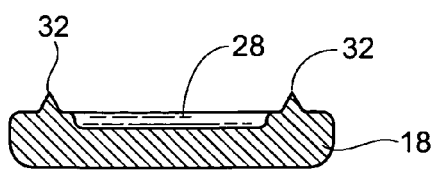
FIG. 9 is a cross sectional view of the strap of the harness clamp tie of the present invention.
Figure 10:
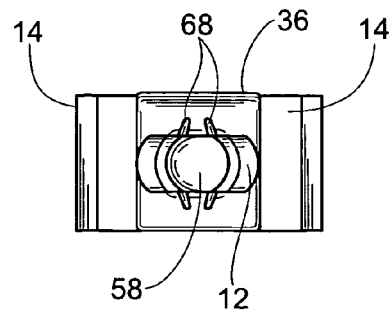
FIG. 10 is an end view of the harness clamp tie of the present invention.

Referring to FIGS. 6 and 7, one end of the strap 18 is integrally formed with the locking head 16. The strap transition 19 between the locking head 16 and the strap 18 is tapered to increase the strap 18 strength at that junction. This will help prevent breakage, particularly in dry conditions. The free end of the strap 18 ends in a strap tail portion 22. The strap tail portion 22 extends from the strap 18 at an angle. The strap 18 itself has a generally rectangular shape, except that the free end of the strap tail portion 22 tapers to a point, and the clamping rails 32 as shown in FIG. 9. The strap 18 is generally of a uniform thickness; however the strap tail portion 22 has a reduced thickness and the thickness of the strap 18 begins to taper just before the strap tail portion 22.

Figure 15:
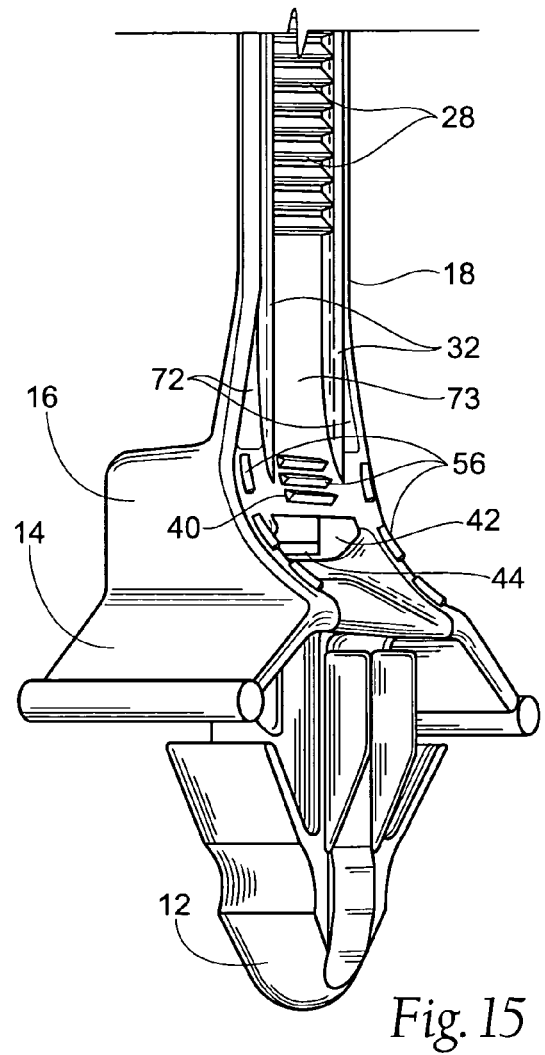
FIG. 15 is a close up perspective bottom view of the fastener and locking head end of the harness clamp tie of the present invention.

The strap 18 has a bottom surface and a top surface. The bottom surface is shown in FIGS. 1 and 7. The strap 18 has a series of spaced apart serrations 28 integrally formed on the bottom surface thereof. As will be described in more detail below, the serrations 28 on the bottom surface of the strap 18 will engage the pawl 44 when the strap 18 is inserted into the locking head 16. As is best seen in FIGS. 1, 9, and 15, the strap 18 is also formed with nonslip rails 32 extending along both edges of the bottom surface of the strap 18, which prevent longitudinal motion of the bundled items and allows for a lower tension setting in a Tension and Cutoff Tool, as will be described further below. FIG. 9 shows a cross sectional view of the strap 18, including the nonslip rails 32.

Figure 4:
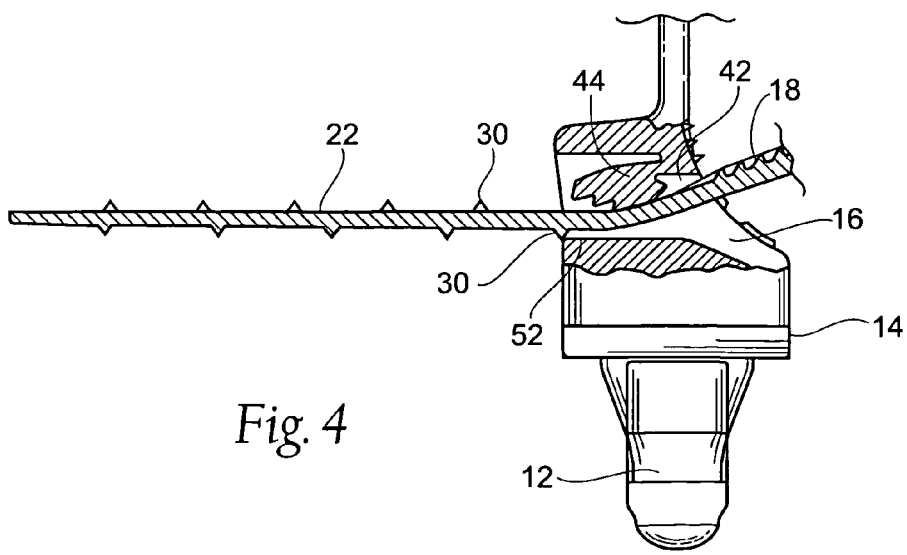
FIG. 4 is a sectional view of the locking head of the harness clamp tie of the present invention, with the strap inserted through the locking head, showing the location of the pawl when a conic point engages the interior of the slot.
Figure 5:
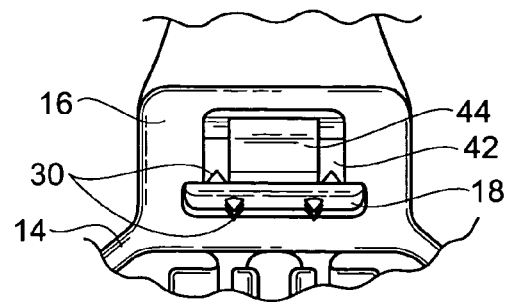
FIG. 5 is a top plan close up view of the pawl disposed in the locking head of the harness tie clamp of the present invention.

The tail portion 22 of the strap 18 has a series of conic friction points 30 integrally formed on both the bottom surface and the top surface thereof. These friction points 30 serve to provide extra grip for an operator when the strap 18 is being pulled tight around a bundle of items 20 which may reduce the incidence of carpal tunnel syndrome. The friction points also provide tactile engagement stops when the strap 18 is inserted into the locking head 16. In the preferred embodiment each set of fiction points 30 is substantially aligned in two rows, each row containing several friction points 30, as shown in FIGS. 6 and 7. The rows of friction points 30 on the bottom surface of the strap 18 straddle the pawl 44 as shown in FIG. 5. However, as shown in FIG. 4, the rows of friction points on the top surface of the strap 18 engage the interior of the slot 42 as the tail portion 22 is inserted through the slot 42. The pawl 44 flexes back slightly when a friction point 30 engages the interior of the slot 42 and the conic friction point 30 is slightly compressed between the slot wall and the pawl 44. The relief and reduction of force when the conic friction point 30 pops out of the slot 42 provides the tactile engagement stops referred to above.

Figure 8:
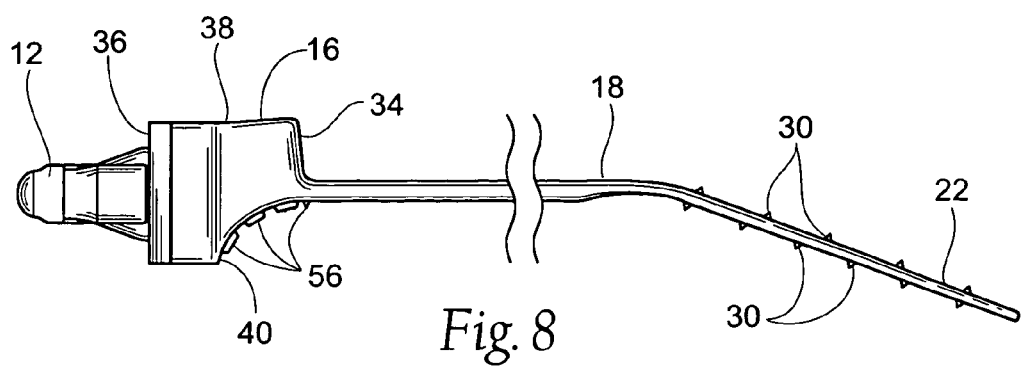
FIG. 8 is a side elevation view of the harness clamp tie of the present invention.

As best shown in FIG. 8, the locking head 16 has an opposing strap side 34 and back side 36, as well as an opposing top surface 38 and bottom surface 40. The locking head 16 has a slot 42 therethrough. The slot 42 is generally perpendicular to the longitudinal extent of the strap 18. The slot 42 is shaped and dimensioned to allow the tail portion 22 of the strap 18 to be inserted therethrough. The tapered tail portion 22 of the strap 18 facilitates insertion of the strap 18 through the slot 42. The items 20 to be secured by the harness clamp tie 10 are secured by looping the strap 18 around the items 20 and inserting the tail portion 22 of the strap 18 though the slot 42 in the adjacent locking head 16. The tail 22 with friction points 30 is then pulled to tighten strap 18 around the items 20.

Figure 3B:
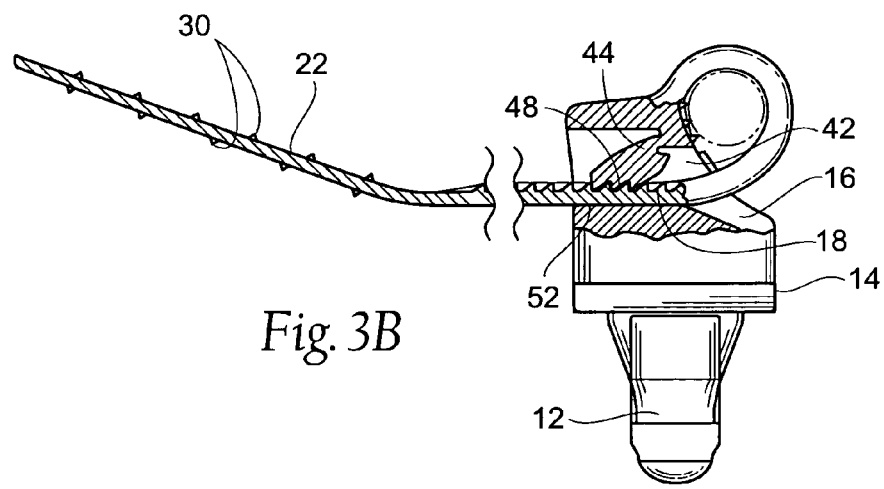
FIG. 3B is a sectional view of the locking head of the harness clamp tie of the present invention, with the strap inserted through the locking head supporting a single elongate item.

As shown in FIGS. 3 and 15, a pawl 44 is provided within the slot 42 of the locking head 16 for securing the strap 18 within the slot 42 and around the items 20 to be secured. The pawl 44 has a generally wedge or cam shaped cross section. A forward surface of the pawl 44 is provided with a plurality of teeth 48 that engage the complementary serrations 28 formed on the bottom surface of the strap 18 when the strap 18 is looped around the bundle of items 20 to be secured and the tail portion 22 is inserted through the slot 42.

As best seen in FIGS. 3A and B, the pawl 44 is hingedly connected to the locking head 16 to allow the pawl 44 to pivot relative to the locking head 16. Preferably the pawl 44 is biased toward the inserted portion of the strap 18 to pinch the strap 18 between the pawl 44 and the interior backwall 52 of the slot 42. This arrangement helps ensure intimate contact between the serrations 28 on the strap 18 and the teeth 48 of the pawl 44. Preferably, the teeth 48 of the pawl 44 and the serrations 28 on the strap 18 are ramped in opposite directions to provide for a slip resistant grip.

The ramped surfaces of the teeth 48 and the serrations 28 are formed to push the pawl 44 away from the strap 18 as the strap 18 is inserted through the slot 42. Withdrawing movement of the strap 18 relative to the slot 42, however, pulls the pawl 44 into engagement with the serrations 28 of the strap 18. By this engagement, withdrawing movement of the strap 18 is prevented and the strap 18 is secured within the slot 42 and around the bundle of items 20 to be secured. The harder the strap 18 is pulled, the more the pawl 44 is wedged, and the more secure the bundle of items 20 is.

Figure 11:
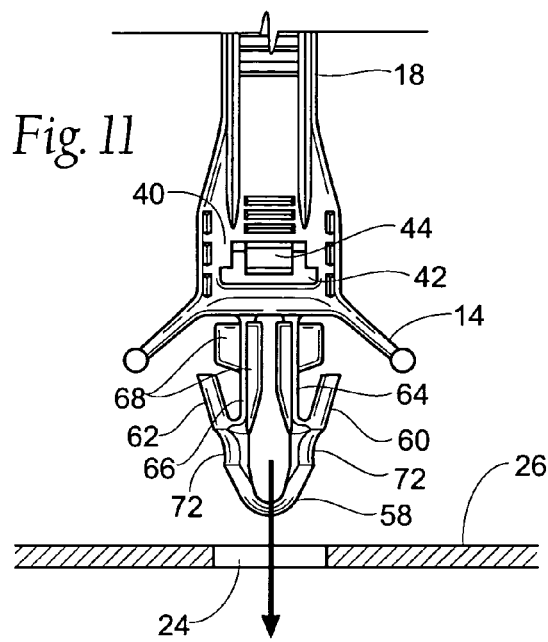
FIG. 11 is a view of the fastener and locking head end of the harness clamp tie of the present invention just prior to insertion into an aperture.
Figure 12:
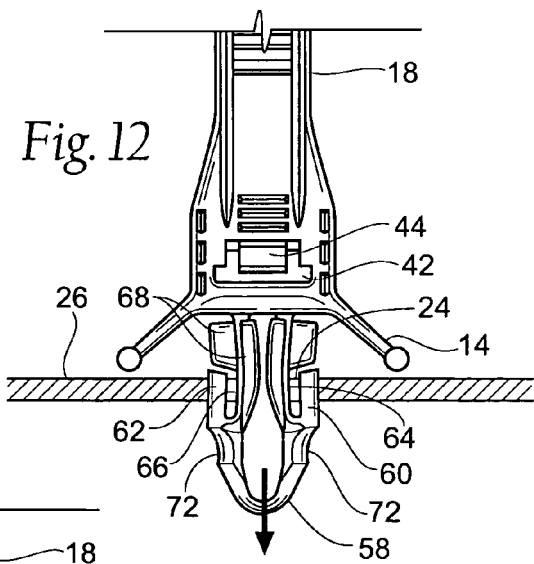
FIG. 12 is a view of the fastener and locking head of the harness clamp tie of the present invention as the locking head is being inserted into an aperture.
Figure 13:
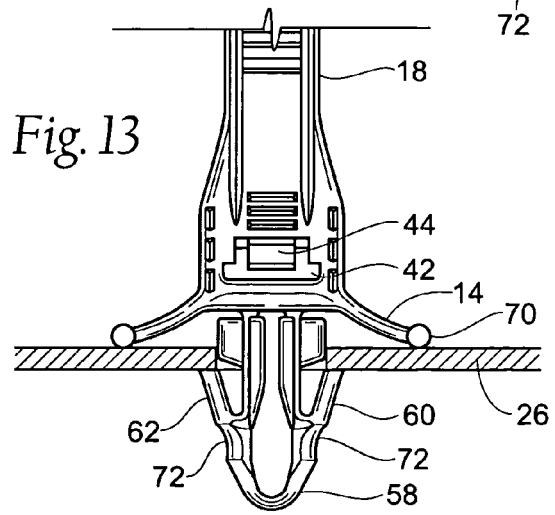
FIG. 13 is a view of the fastener and locking head end of the harness clamp tie of the present invention inserted and retained in an aperture of a panel.

FIG. 15 shows the bottom surface 40 of the locking head 16 in further detail. The bottom surface 40 of the locking head 16 is smoothly curved. The curved bottom surface 40 provides circumferential clamping force around bundles. As seen in FIGS. 3A and B, the bottom surface 40 closely mates with the bundle diameter. The curved bottom surface is also adapted to provide added support for the bundle tie relationship when the user pushes on the bundle in the vicinity of the harness clamp tie 10, to engage the harness clamp tie 10 with the panel-mounting aperture 24 as shown in FIGS. 11-13.

A multitude of anti-rotational and anti-slide clamping rails 56 are formed on the bottom surface 40 of the locking head 16. These clamping rails 56 can be seen most clearly on FIG. 15. The preferred embodiment of the cable tie has nine (9) clamping rails 56 formed on the bottom surface 40 of the locking head 16. As described above and shown in FIGS. 3A and B, two nonslip rails 32 are formed on the bottom surface of the strap. Therefore the preferred embodiment has a total of eleven (11) rails. In the preferred embodiment of the invention the clamping rails 56 have a triangular cross section. These clamping rails 56 prevent rotational and sliding movement on both large and small bundle diameters by biting into the surface of the items to be bundled 20 when the strap 18 is secured around the bundle 20. The clamping rails 56 also allow for a lower tension setting on the Tension and Cutoff Tool, as will be described below in more detail.

With further reference to FIG. 15, the strap transition area 19 between the locking head 16 and the strap 18 is formed with at least one hollowed out portion 72,73. In the preferred embodiment of the invention the hollowed out portion 72 appears as two triangular indentations in the bottom surface of the strap 18. The triangular hollowed out portions 72 are located on the outside of the nonslip rails 32. The preferred embodiment also includes a center hollowed out portion 73 located in the between the nonslip rails 32. The center hollowed out portion 73 forms a generally rectangularly shaped area between the clamping rails 56 on the head and the serrations 28 on the strap 18. The hollowed out portion 72, 73 allows the strap 18 to bend easily. The strap 18 is hollowed out, rather than reducing the entire strap 18 thickness to retain strength in the strap 18. The strap 18 is hollowed out near to the locking head 16 of the tie, so that the strap 18 is very flexible in the transition area 19 and can therefore be fastened around a very small bundle 20. When the strap 18 is tightened around a very small bundle 20, the strap 18 bends generally at the hollowed out portion 72, 73.

Figure 16:
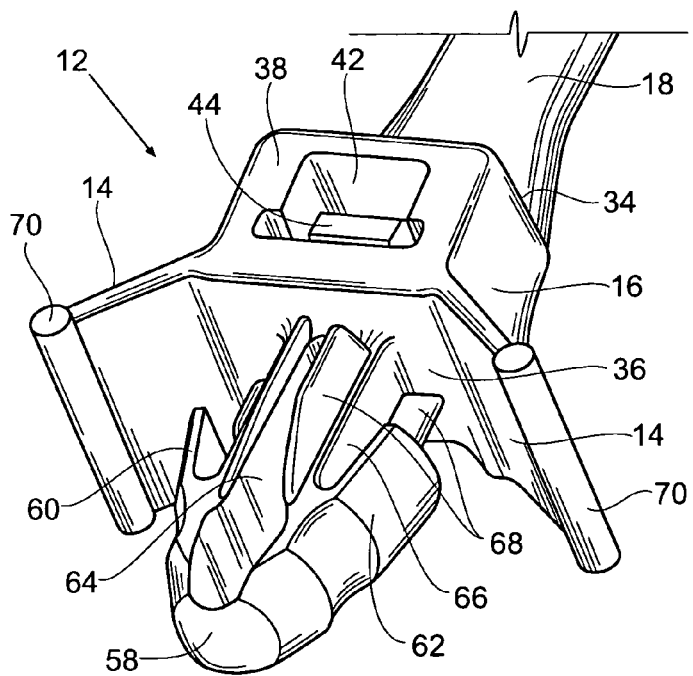
FIG. 16 is a close up perspective top view of the fastener and locking head end of the harness clamp tie of the present invention.

Referring to FIG. 16, the fastener 12 is integrally formed to the back side 36 of the locking head 16. The fastener 12 extends from the locking head 16 in the direction opposite the strap 18. The longitudinal axis of the fastener 12 is substantially aligned with the flexible strap 18. In the preferred embodiment, the fastener 12 has an open-centered arrowhead shape. The fastener is a two bladed arrowhead having a first blade 60, a second blade 62, and a leading tip 58 connecting the blades 60,62 at their farthest point from the fastener side of the locking head 16. The leading tip 58 is sectioned as thin as possible to allow it to flex or fold while being inserted into the mounting aperture 24. The first blade 60 is connected to a first arm 64 and the second blade 62 is connected to a second arm 66. Each arm 64,66 extends out perpendicularly from the back side 36 of the locking head 16 and is generally rectangular in shape. Each arm 64,66 sits in a plane that is generally perpendicular to the plane of the strap 18, however the arms 64,66 are inwardly compressible and upon insertion of the fastener 12 into the mounting aperture 24. The blades 60,62 are biased slightly outward and are also inwardly compressible upon insertion of the fastener 12 into the mounting aperture 24. The compression of the arms 64,66 and blades 60,62 will be discussed further below.

Figure 14A:
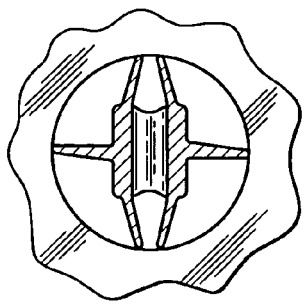
FIG. 14A is a cross sectional view of the vanes of the fastener of the harness clamp tie of the present invention when the fastener is inserted into an aperture.
Figure 14B:
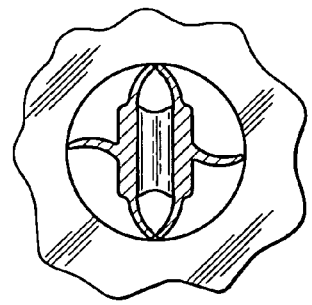
FIG. 14B is a cross sectional view of the vanes of the fastener of the harness clamp tie of the present invention when the fastener is inserted into an aperture.

Vanes 68 are integrally formed on the arms 64,66 of the fastener 12 near the point of attachment to the locking head 16. In the preferred embodiment of the clamp tie 10, six (6) vanes 68 are utilized. Three vanes 68 are formed on each arm 64,66. One vane 68 extends from each edge of each arm 64,66 in generally the same plane as the arm 64,66. The vanes 68 are adapted to adjust to varying aperture 14 diameters. However each pair of vanes 68 can be angled inward to control the direction in which they curl or collapse. The third vane 68 extends outward from the arm 64,66 parallel to the plane of the flexible strap 18. FIG. 14A shows a cross section of the vanes 68 in a mounting aperture 24. FIG. 14B shows a cross section of the vanes 68 in a slightly smaller mounting aperture 24, showing the vanes 68 collapsing to fit the mounting aperture 24. The vanes 68 are tapered such that each vane 68 is slightly thicker at the point where it is connected to the arm 64, 66 than at the free end. This provides increased flexibility in the vanes 68. The configuration of the vanes 68 serves to maintain consistent force and self center the fastener 12 in the mounting aperture 24 to provide maximum retention of the fastener 12 in the mounting aperture 24.

A pair of opposed flexible winged springs 14 are integrally formed to the back side 36 of the locking head 16. The flexible winged springs 14 engage the panel 26 when the fastener 12 is completely inserted into the mounting aperture 24 in the panel 26. The flexible winged springs 14 are generally rectangular and extend out from the locking head 16 at an angle of greater than 90 degrees with respect to the back side 36 of the locking head 16. To facilitate flexing, the flexible winged springs 14 get thinner at the free end thereof. The flexibility of the winged springs 14 is important because if the winged springs were to fold upon compression, there would be a loss of spring force. The flexibility allows the flexible winged springs 14 to apply more tension when compressed fully and to apply tension even in the thickest panels 26. The preferred embodiment of the flexible winged springs 14 has a generally cylindrical portion 70 at each of the free end of the flexible winged springs 14. These cylindrical portions 70 are used to allow ejector pins to push the part out of the mold during the molding process.

The high flexibility of the winged springs 14 aids in the reduction of required insertion force and maintenance of uniform spring force throughout various panel thicknesses. The function of the flexible winged springs 14 can best be seen in FIGS. 11-13. In use, the fastener 12 of the harness clamp tie 10 is lined up with the mounting aperture 24 in the panel 26. The leading tip 58 is inserted into the mounting aperture 24. When the harness clamp tie 10 is pushed further into the mounting aperture 24, blades 60,62 are wedged into the inner surface of the mounting aperture 24 and the arms 64,66 are compressed. When the arms 64,66 are compressed to point that they contact each other, the blades 60,62 begin bend toward the arms 64,66. As is shown in FIG. 13, when the harness clamp tie 10 is further advanced in the mounting aperture 24 such that the blades 60,62 clear the mounting aperture 24, the blades 60,62 and the arms 64,66 spring back to their normal biased position. This springing back of the blades 60,62 and the arms 64,66 provides a tactile indication to the installer. This tactile indication is useful in installations where the installer can either not clearly see the installation, or in loud manufacturing environments.

The harness clamp tie 10 is retained in the mounting aperture 24 by the blades 60,62 on one side of the panel 26, and the flexible winged springs 14 on the opposite side of the panel 26. The cylindrical portions 70 of the winged springs 14 engage the panel 26 to make the system more stable. The flexibility of the flexible winged springs allows the harness clamp tie to be utilized on panels with various thicknesses. As stated above, the cylindrical portions 70 exist in the rounded shape to accommodate an ejector pin or a similar size and shape that ejects the harness clamp tie 10 out of the mold.

As seen in FIG. 2, the harness clamp tie 10 may be used to tie together a bundle of wires 20 or the like and to attach this bundle 20 to a panel 26 with a mounting aperture 24. The tail end 22 of the strap 18 is wrapped around the bundle of items 20 such that the serrated portion of the strap 18 is located on the inside surface of the loop. The tail 22 of the strap 18 is then inserted through the slot 42 in the locking head 16. The tail 22 of the strap 18, which is now protruding from the slot 42, is pulled. As the strap 18 is pulled, the serrated portion of the strap 18 enters the slot 42. The pawl 44 disposed within the slot 42 then engages at least one of the serrations 28 such that movement of the strap 18 in the opposite or withdrawal direction is prevented. When the strap 18 is pulled tight, the objects are secured in a neat bundle. The fastener 12 of the harness clamp tie 10 can then be inserted into a mounting aperture 24 in a panel 26, securing the harness clamp tie 10 to the panel 26. It should be noted that the strap 18 can be fastened around a single item in order to attach that a single item to a panel 26 or around multiple items as illustrated.

FIGS. 17-21B show a second embodiment of a harness clamp tie 110 according to the present invention. The embodiment of FIGS. 17-21B is similar to the embodiment of FIGS. 1-16, however instead of an open-centered arrowhead fastener 12, the second embodiment utilizes a rectangular fir fastener 112.

Figure 17:
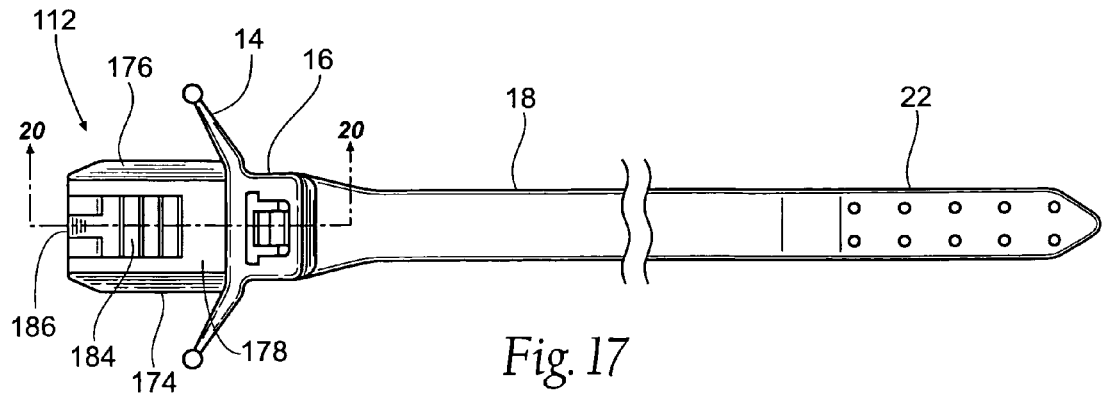
FIG. 17 is a top plan view of a second embodiment of the harness clamp tie of the present invention utilizing a rectangular fir mount.
Figure 18:
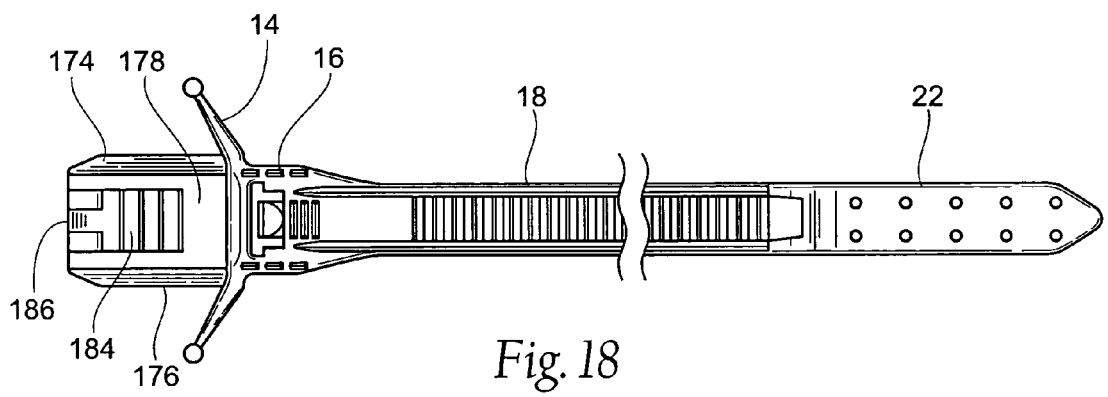
FIG. 18 is a bottom plan view of a second embodiment of the harness clamp tie of the present invention utilizing a rectangular fir mount.
Figure 19:
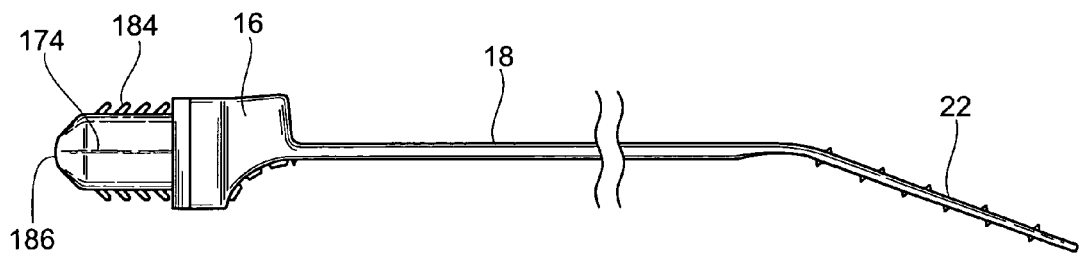
FIG. 19 is a side elevation view of a second embodiment of the harness clamp tie of the present invention utilizing a rectangular fir mount.
Figure 20:
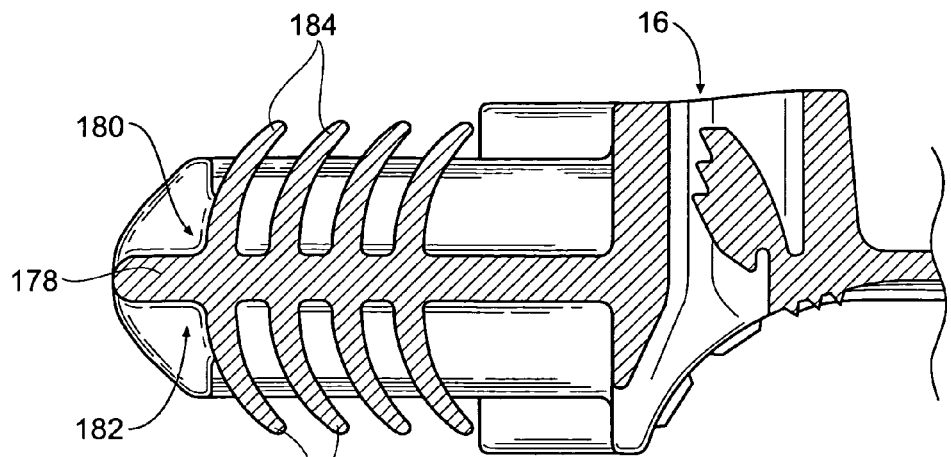
FIG. 20 is a partial enlarged side elevation view of the harness clamp tie fastener and locking head shown in FIG. 19.

FIG. 17-19 show a top, bottom, and side view of the harness clamp tie 110 of the present invention including a rectangular fir fastener 112. FIG. 20 shows a sectional view of the rectangular fir fastener 112 and the locking head 16. The rectangular fir fastener 112 has three sections: a first section 174, a second section 176, and a center section 178 located intermediate of the first section 174 and the second section 176. The three sections 174,176,178 extend from the back side 36 of the locking head 16. The plane of the center section 178 is generally perpendicular to the plane of the first section 174 and the second section 176. The center section 178 has a top side 180 and a bottom side 182. A plurality of branches 184 extend from both the top side 180 and bottom side 182 of the center section 178. As can be seen in FIG. 20, the branches 184 curve toward the locking head 16 of the strap 18, and each branch 184 is tapered at its free end. The rectangular fir fastener 112 has a leading tip 186 which is opposite the locking head 116. The leading tip 186 is tapered so as to aid in insertion of the fastener 112 into a mounting aperture 24.

Figure 21A:
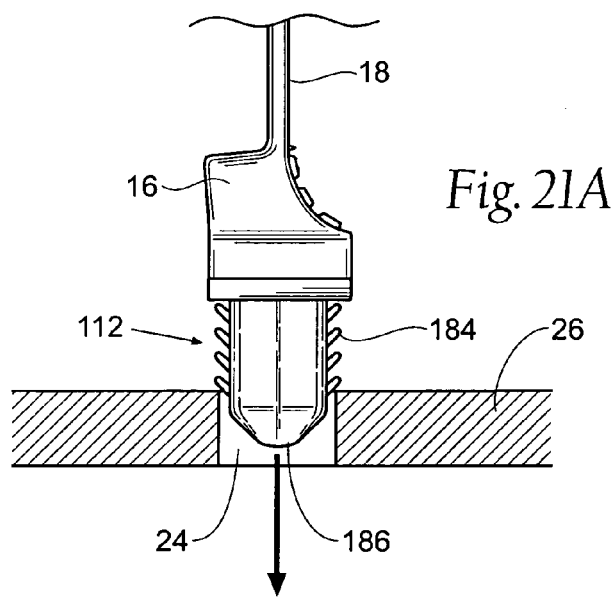
FIG. 21A is a view of the fastener and locking head end of the harness clamp tie just prior to insertion into an aperture.
Figure 21B:
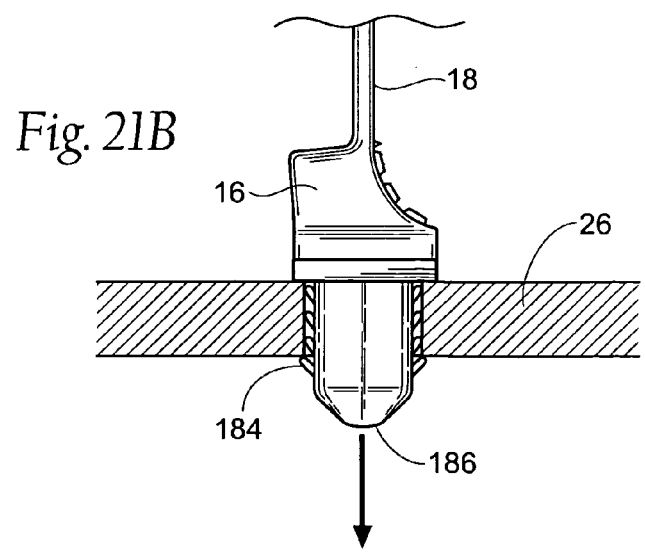
FIG. 21B is a view of the fastener and locking head of the harness clamp tie inserted and retained in an aperture of a panel.

FIGS. 21A and 21B show how the rectangular fir fastener 112 is inserted into a mounting aperture 24. The leading tip 186 of the fastener 112 is lined up with the mounting aperture 24 in the panel 26 as seen in FIG. 21A. The leading tip 186 is inserted into the mounting aperture 24. When the fastener 112 is pushed further into the aperture 24, the branches 184 are wedged into the inner surface of the aperture 24. As seen in FIG. 21B, the branches 184 spring back to their original configuration after they exit the mounting aperture 24 on the opposite side of the panel 26.

When the fastener 112 is securely inserted into a mounting aperture 24, the free end of a set of branches 184 will engage the backside of the panel 26. The flexible winged springs 14 operate as in the previous embodiment to engage the mounting panel 26 when the fastener 112 is completely inserted into a mounting aperture 24 in the panel 26. The fastener 112 is retained in the aperture 24 by the ends of the branches 184 engaging the backside of the panel 26, and the flexible winged springs 14 engaging the opposite side of the panel 26.

The harness clamp tie 10 could be fabricated of various materials; however the preferred embodiment of the present disclosure is made a synthetic material such as nylon 6/6 IMHSUV. In the preferred embodiment, the harness clamp tie 10 as described is adapted to fit bundle diameters ranging from 1.5 mm to 44 mm (0.06 inches to 1.57 inches).

The fastener 12 of the harness clamp tie 10 is adapted to be inserted into a tie mounting aperture 24 in a panel 26. In the preferred embodiment, the mounting aperture 24 diameter can range between 6.1 mm to 7.2 mm (0.24 inches to 0.28 inches). The thickness of the panel 26 can range between 0.6 mm to 2.6 mm (0.023 inches to 0.102 inches).

After the objects are secured into neat bundles with strap 18 or a single object is secured with strap 18, the leading tip 58 of the fastener 12 is inserted into the mounting aperture 24. In the preferred embodiment, the maximum force required to push the harness clamp tie 10 fastener 12 into the mounting aperture 24 is 15 lbs. The minimum force required to remove the fastener 12 from the aperture 24 is 50 lbs. When the harness clamp tie 10 is securely attached to the panel 26 it is possible to remove the harness clamp tie with sufficient force, however the fastener 12 will be damaged and not reusable.

The harness clamp tie 10 is adapted to be used with the Handheld Tension and Cut-off Tool as described in U.S. Pat. No. 5,492,156, owned by the same assignee. The Tension and Cut-off Tool is a gun-shaped housing with a hand grip and barrel portion. After the tail portion 22 of the strap 18 has been looped around a bundle and inserted into the locking head 16 slot 42, the tail portion 22 is inserted into the nose slat at the end of the barrel of the tool. The tool engages the tail portion 22 of the strap 18 and pulls it through until a predetermined tension has been reached. The tool then automatically cuts off the excess tail portion 22 closely adjacent the locking head 16. Specifically, the nonslip rails 32 and the clamping rails 56 provide a concentrated force to grip the bundle preventing rotational and longitudinal movement which allows for a reduced tension setting on the Tension and Cut-off Tool. Both rotational and longitudinal movements are reduced because the rails 32, 56 bite into insulation on the wires being bundled. The thin strap 16 is easier to cut which reduces hand fatigue and carpal tunnel.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A one piece cable tie adapted to be inserted into a mounting aperture on a panel, the cable tie comprising:
   an elongate flexible strap element defining a longitudinal axis and having opposed locking head and tail ends and opposing bottom and top surfaces, the strap having a tail portion formed at the tail end thereof, the strap being of a substantially fixed length, and having a series of serrations being formed on the bottom surface of the strap;
   a locking head being integrally connected to the locking head end of the strap, the locking head having opposed strap and back sides, as well as opposing top and bottom sides, the locking head having means defining a slot therethrough, said slot being generally perpendicular to the longitudinal axis of the strap for receiving the strap, a pawl disposed within said slot adapted to engage at least one of the serrations of the strap when the strap is looped around a bundle;

said locking head having opposing top and bottom surfaces, said bottom surface of said locking head being curved between the locking head and the bottom surface of the strap;

a fastener integrally formed to the back side of the locking head for securing the cable tie on a panel, the fastener having a generally arrowhead shape with a leading tip and two blades, each of the blades being integrally formed to an arm, each arm being integrally formed and extending between the blade and the locking head, the blades and arms being inwardly compressible upon insertion of the fastener into the mounting aperture;

said bottom surface of the strap having a pair of parallel, longitudinally extending, nonslip rails, each of said rails being formed adjacent a respective longitudinally extending edge of the strap; and a center hollowed out portion located between the nonslip rails and two side hollowed out portions, wherein one side hollowed out portion is located on either side of the nonslip rails.

2. The one piece cable tie as claimed in claim 1 wherein a plurality of conic friction points are formed on both opposing surfaces of the tail portion of the strap.

3. The one piece cable tie as claimed in claim 1 wherein a pair of flexible winged springs are integrally formed to the back side of the locking head, the flexible winged springs engaging the panel when the fastener is inserted into the mounting aperture.

4. The one piece cable tie as claimed in claim 1 wherein the fastener has multiple vanes extending substantially outward from the arms of the fastener.

5. The one piece cable tie as claimed in claim 1 wherein the locking head has opposed top and bottom sides and several anti-rotational and anti-slide clamping rails are formed on the bottom surface of the locking head.

6. The one piece cable tie as claimed in claim 1 further comprising the at least one hollowed out portion being on the bottom surface of the strap.

7. The one piece cable tie as claimed in claim 6 wherein the at least one hollowed out portion is located at the locking head end of the strap.

\* \* \* \* \*